United States Patent
Lewty et al.

(10) Patent No.: US 12,314,489 B2
(45) Date of Patent: *May 27, 2025

(54) COMPUTER SYSTEM WITH COLOR SAMPLING STYLUS

(71) Applicant: Apple Inc., Cupertino, CA (US)

(72) Inventors: Nicholas C. Lewty, Singapore (SG); Mahdi Nezamabadi, San Jose, CA (US); Po-Chieh Hung, Sunnyvale, CA (US); Tze Yong Poh, Singapore (SG)

( * ) Notice: Subject to any disclaimer, the term of this patent is extended or adjusted under 35 U.S.C. 154(b) by 331 days.

This patent is subject to a terminal disclaimer.

(21) Appl. No.: 17/390,641

(22) Filed: Jul. 30, 2021

(65) Prior Publication Data

US 2021/0357044 A1    Nov. 18, 2021

Related U.S. Application Data

(63) Continuation of application No. 16/682,857, filed on Nov. 13, 2019, now Pat. No. 11,126,281.

(60) Provisional application No. 62/792,321, filed on Jan. 14, 2019.

(51) Int. Cl.
    *G06F 3/0354*   (2013.01)
    *G06F 3/041*    (2006.01)
    *G06F 3/04883*  (2022.01)

(52) U.S. Cl.
    CPC ...... *G06F 3/03545* (2013.01); *G06F 3/04162* (2019.05); *G06F 3/04883* (2013.01)

(58) Field of Classification Search
    CPC .............. G06F 3/03545; G06F 3/04162; G06F 3/04883; G06F 3/0383; G06F 2203/0384; G01J 3/524; G01J 3/50; G01J 3/0278; G01J 3/513; G01J 3/0272; G01J 3/027; G01J 3/501
    See application file for complete search history.

(56) References Cited

U.S. PATENT DOCUMENTS

| | | |
|---|---|---|
| 6,377,249 B1 | 4/2002 | Mumford |
| 9,323,348 B2 | 4/2016 | Nungester et al. |
| 9,665,187 B2 | 5/2017 | Shu |
| 10,976,838 B2 | 4/2021 | Ivanov |
| 2006/0244738 A1* | 11/2006 | Nishimura .......... G06F 3/03545 345/179 |
| 2010/0128064 A1 | 5/2010 | Taylor et al. |

(Continued)

FOREIGN PATENT DOCUMENTS

CN    106249921 A    12/2016

*Primary Examiner* — Yaron Cohen
(74) *Attorney, Agent, or Firm* — Treyz Law Group, P.C.; G. Victor Treyz; Kendall P. Woodruff

(57) ABSTRACT

A device such as a computer stylus may have a color sensor. The color sensor may have a plurality of photodetectors each of which measures light for a different respective color channel. The color sensor may also have one or more light-emitting devices. Control circuitry may use the light-emitting devices to illuminate an external object while using the photodetectors to measure reflected light to determine the color of the external object. The electronic device may have a housing with an elongated shaft. The shaft may have a tip and an opposing end. The tip may be configured to emit electromagnetic signals that are detected by a touch sensor in a touch sensitive display. The color sensor may be located at the end opposite the tip, may be located at the tip, or may be optically coupled to the tip using a light guide.

20 Claims, 6 Drawing Sheets

(56) References Cited

U.S. PATENT DOCUMENTS

| | | |
|---|---|---|
| 2012/0331546 A1 | 12/2012 | Falkenburg et al. |
| 2014/0152576 A1 | 6/2014 | Kim et al. |
| 2015/0206506 A1 | 7/2015 | Lee et al. |
| 2015/0212602 A1 | 7/2015 | Lor et al. |
| 2016/0034052 A1* | 2/2016 | Shu ............... G06F 3/03545 345/179 |
| 2016/0306492 A1* | 10/2016 | Togashi ............ G06F 3/04186 |
| 2016/0334891 A1 | 11/2016 | Ozoemenam et al. |
| 2016/0357343 A1* | 12/2016 | Falkenburg ........ G06F 3/0346 |
| 2017/0308015 A1 | 10/2017 | Nakase et al. |
| 2018/0081456 A1 | 3/2018 | Li et al. |
| 2019/0290148 A1 | 9/2019 | Kang et al. |
| 2020/0103988 A1 | 4/2020 | Jeon et al. |
| 2020/0168120 A1 | 5/2020 | Rodriguez Bravo |
| 2020/0225778 A1 | 7/2020 | Ewty et al. |
| 2021/0041288 A1 | 2/2021 | Hung et al. |
| 2021/0124432 A1 | 4/2021 | Nicholson et al. |
| 2021/0290046 A1 | 9/2021 | Nazareth et al. |

\* cited by examiner

COMPUTER SYSTEM WITH COLOR SAMPLING STYLUS

This application is a continuation of U.S. patent application Ser. No. 16/682,857, filed Nov. 13, 2019, which claims the benefit of provisional patent application No. 62/792,321, filed Jan. 14, 2019, which are hereby incorporated by reference herein in their entireties.

FIELD

This relates generally to electronic systems, and, more particularly, to systems with electronic devices such as computer stylus devices.

BACKGROUND

Electronic devices such as computers can be controlled using computer mice and other input accessories. Some devices, such as tablet computers have touch sensitive displays. An input device such as a computer stylus may ay be used to interact with a touch sensitive display. For example, a user of a stylus may draw on the display.

SUMMARY

A system may include a first electronic device such as a computer stylus and a second electronic device such as a tablet with a touch sensitive display. The first electronic device may supply input to the second electronic device during operation.

The first electronic device may have a housing. A color sensor may be coupled to the housing. The color sensor may have a plurality of photodetectors each of which measures light for a different respective color channel. The color sensor may also have one or more light-emitting devices. Control circuitry may use the light-emitting devices to illuminate an external object while using the photodetectors to measure light that is reflected back from the illuminated object to determine the color of the external object. The color may be used to control the color of objects being drawn with a drawing program on the second electronic device or may otherwise be used in the system.

The housing of the first electronic device may form an elongated computer stylus shaft. The shaft may have a tip for supplying electromagnetic signals to the touch sensitive display of the second electronic device and may have an opposing end. The color sensor may be located at the end opposite the tip or may be optically coupled to the tip using a light guide.

Input devices such as proximity sensors, orientation sensors, and buttons may be used in determining when a color measurement is to be made using the color sensor. The input devices may include a switch that is triggered when the shaft is pressed against an external object, a proximity sensor that detects when the color sensor is adjacent to the external objects, and an orientation sensor that determines when the stylus has been placed in a given orientation to take a color measurement (e.g., an upside down orientation). If desired, other triggering inputs may be used in determining when to gather color measurements with the color sensor.

DETAILED DESCRIPTION

Computer systems and other systems may use input-output devices to gather user input. For example, a computer stylus, which may sometimes be referred to as a digital pencil, electronic pen, stylus device, etc., may be used to draw on a touch screen in a tablet computer. A computer stylus may also be used to draw on drawing pad surfaces that do not contain displays. Input-output devices such as these may interact wirelessly with external equipment. For example, a computer stylus may use one or more electrodes located at the tip of the stylus to generate alternating-current (AC) electromagnetic signals that are detected by a capacitive touch sensor in a tablet computer (e.g., to determine the position of the tip of the device relative to the touch sensor) and may use a wireless local connection such as a Bluetooth® link or other wireless communications link to convey information between the input-output device and the tablet computer. If desired, a computer stylus may have wireless power receiving circuitry that allows a battery in the computer stylus to be wirelessly charged (e.g., using inductive charging).

Figure 1:
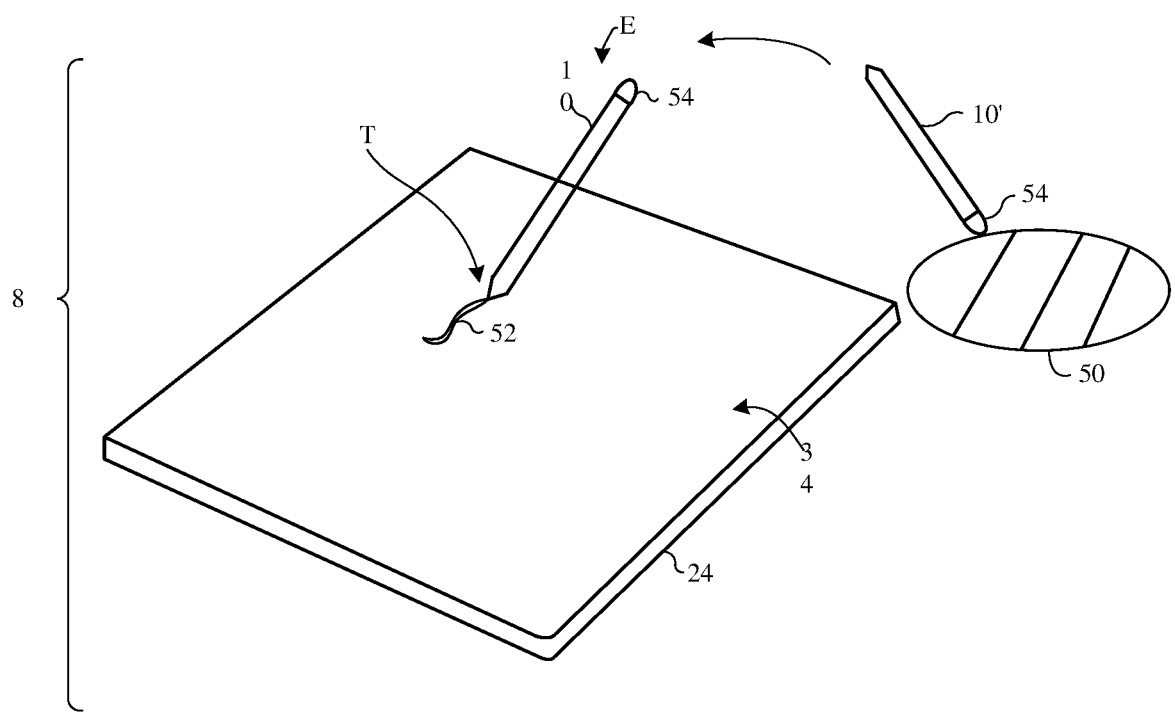
FIG. 1 is a perspective view of an illustrative system with electronic devices in accordance with an embodiment.

An illustrative system with an input device such as a computer stylus is shown in FIG. 1. As shown in FIG. 1, system 8 may include an input device such as device 10 (e.g., a computer stylus) and additional electronic equipment such as device 24 (e.g., a tablet computer, cellular telephone, or other device with a display). Display 34 of device 24 may be touch sensitive. For example, display 34 may include a two-dimensional capacitive touch sensor array that overlaps an array of pixels configured to display an image. Electrodes at tip T of device 10 may emit electromagnetic signals that are detected by the touch sensor of display 34. This allows tip T to be used to draw on-screen items such as line 52 on screen 34 (e.g., using a drawing program or other software running on device 24). Signals from tip T may also be used to make menu selections, to manipulate visual content displayed on other devices in system 8, and/or may otherwise be used to provide computer stylus input to system 8. Device 10 may include wireless circuitry for communicating with corresponding wireless communications circuitry in device 24 (e.g., over a Bluetooth® link or other wireless link). Using this wireless link, device 10 may, for example, convey sensor measurements from device 10 to device 24 to control device 24 or may otherwise supply input to system 8.

Device 10 of FIG. 1 may include a color sensor such as color sensor 54. Color sensor 54 may be located at end E of device 10 opposite to tip T of device 10 or may be located elsewhere in device 10 (e.g., at tip T). Device 10 may have an elongated housing that forms a computer stylus shaft or may have other suitable housing structures.

During color sampling operations, device 10 can use color sensor 54 to measure the color of an item. For example, device 10 can be placed so that end E is adjacent to real-world object 50 as shown by illustrative device 10' of FIG. 1. In this location, sensor 54 can be used to measure the color of object 50. This color information can then be conveyed wirelessly to device 24.

Device 24 can use a sampled color from sensor 54 when new content is being drawn on display 34. For example, a measured color can be placed in a color palette in a drawing program. A user of device 10 can then assign the color to a brush in a drawing program and can draw lines such as line 52 or other items using this color. Device 10, device 24, and/or other equipment in system 8 (e.g., a remote server and/or other electronic equipment) can also use measured colors for calibrating displays, calibrating printers, making health-related measurements, identifying paint colors (e.g., when attempting to identify a color of paint to match an existing painted object), identifying colors for home applications or other applications (e.g., selecting cosmetics), identifying food attributes, identifying colors associated with art and design projects, etc.

Figure 2:
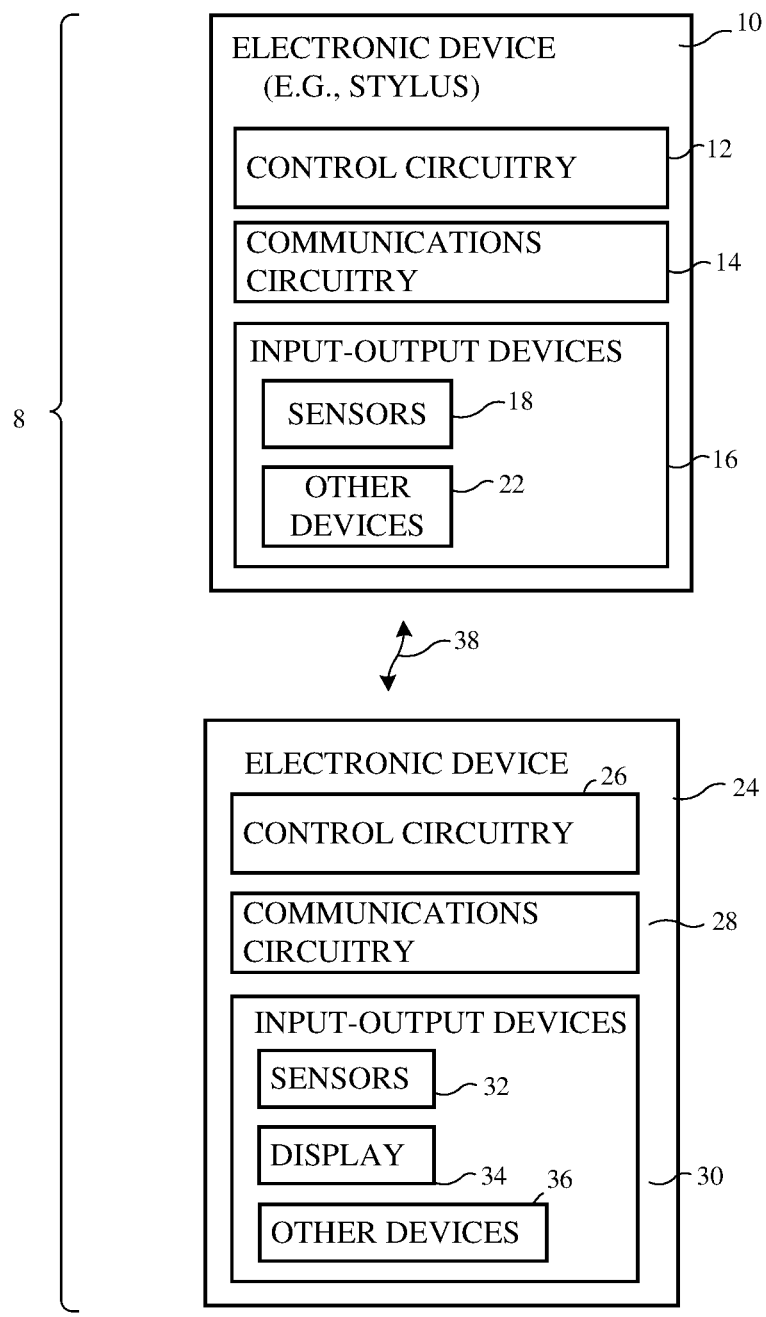
FIG. 2 is a schematic diagram of an illustrative system in accordance with an embodiment.

A schematic diagram of illustrative electronic devices in system 8 is shown in FIG. 2. As shown in FIG. 2, system 8 may include one or more electronic devices such as a computer stylus (e.g., device 10) that are used in gathering user input and that are used in gathering color measurements. System 8 may also include one or more electronic devices such as electronic device 24 that can be controlled using user input gathered by device(s) 10 and that can use color measurements gathered by device(s) 10. There may, in general, be one or more devices 10 in system 8 and one or more devices 24 in system 8. Illustrative configurations in which system 8 includes a single electronic device 10 (e.g., a single computer stylus) and a single device 24 that is controlled by device 10 (e.g., an electronic device with a touch screen display) may sometimes be described herein as an example.

Device 10 may gather user input (and optionally provide haptic output, visual output, audio output and/or other output) and may therefore sometimes be referred to as user input device (or input-output device). The user input that is gathered by device 10 may include information on the position of device 10 (e.g., motion and orientation information gathered using an inertial measurement unit or other position sensor). Sensor input such as color readings may also be gathered by device 10. The position of tip T of device 10 relative to display 34 of device 24 may be determined by using electrodes in device 10 to transmit electromagnetic signals (e.g., alternating-current signals) while using a touch sensor formed from an array of capacitive touch sensor electrodes in display 34 to detect and monitor the location of the transmitted signals from tip T. In this way, tip T can be tracked in system 8 as tip T is moved across the surface of display 34.

Device 24 may include display 34 and may therefore sometimes be referred to as an output device or visual output device. During operation of system 8, color sensor measurements and other measurements from sensor circuitry in device 10 and information on the movement of tip T can be used to adjusting the content displayed on display 34 and may otherwise be used in controlling the operation of device 24 and system 8.

Devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a head-mounted device such as glasses, goggles, a helmet, or other equipment worn on a user's head, or other wearable or miniature device, a television, a computer display that does not contain an embedded computer, a navigation device, an embedded system such as a system in which equipment is mounted in a kiosk, in an automobile, airplane, or other vehicle, or other equipment.

Device 10 may be any suitable electronic device that includes a color sensor such as a computer stylus, a computer mouse, or other input accessory, a cellular telephone, a tablet computer, a wristwatch, other wearable electronic devices, other portable electronic devices, and/or other electronic equipment (e.g., one of devices 24).

Illustrative configurations for system 8 in which device 10 is a computer stylus and device 24 is a tablet computer may sometimes be described herein as an example. This is illustrative. In general, any suitable electronic devices may be used in system 8.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 28, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power (e.g., inductive power coils for transmitting and receiving wireless power) and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may include input devices that are used in gathering user input and/or that are used in gathering information on the environment surrounding the user and/or may include output devices that are used in providing a user with output. Input-output devices 16 (e.g., input devices in devices 16) may include sensors 18 and input-output devices 30 (e.g., input devices in devices 30) may include sensors 32. Sensors 18 and/or 32 may include force sensors (e.g., strain gauges, capacitive force sensors, resistive force sensors, force sensors that include pressure sensors that detect pressure in a fluid that is coupled to one or more force sensing elements formed from collapsible fluid-filled force sensor protrusions, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color light sensors for measuring ambient light and/or for making other color measurements (e.g., color sensors that include light detecting and, if desired, light-emitting devices), image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., three-dimensional optical sensors such as structured light sensors configured to project dots of infrared light onto three-dimensional surfaces of real-world objects and sense three-dimensional shapes by capturing images of the dots using an infrared image sensor and/or optical depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 32 and/or other input-output devices 16 and/or 30 to gather user input (e.g., input devices such as buttons may be used to gather button press input, touch sensors overlapping displays can be used for gathering user touch screen input, touch pads may be used in gathering touch input, microphones may be used for gathering audio input, inertial measurement units may be used in monitoring position and/or orientation, etc.). If desired, alphanumeric keys and/or other buttons may be included in devices 16 and/or 30.

Devices 16 and/or 30 (e.g., output devices in devices 16 and/or 30) may include output devices such as haptic output devices. Haptic output devices can produce motion that is sensed by the user (e.g., through the user's fingertips or other body part). Haptic output devices in devices 16 and/or 30 may include actuators such as electromagnetic actuators such as solenoids, motors, piezoelectric actuators, electroactive polymer actuators, vibrators, linear actuators, rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24).

Devices 16 and/or 30 may include displays and/or other devices that produce visual output. For example, device 24 may include display 34, as described in connection with FIG. 1.

If desired, input-output devices 16 and/or 30 may include other devices 22 and/or 36 such as status indicator lights (e.g., a light-emitting diode in device 10 and/or 24 that serves as a power indicator, and other light-based output devices), displays (e.g., one or more displays in addition to display 34), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may include power transmitting and/or receiving circuits configured to transmit and/or receive wired and/or wireless power signals. For example, devices 10 and/or 24 may include coils and power transmitting circuitry and/or power receiving circuitry that uses the coils to transmit and/or to receive wireless power.

Figure 3:
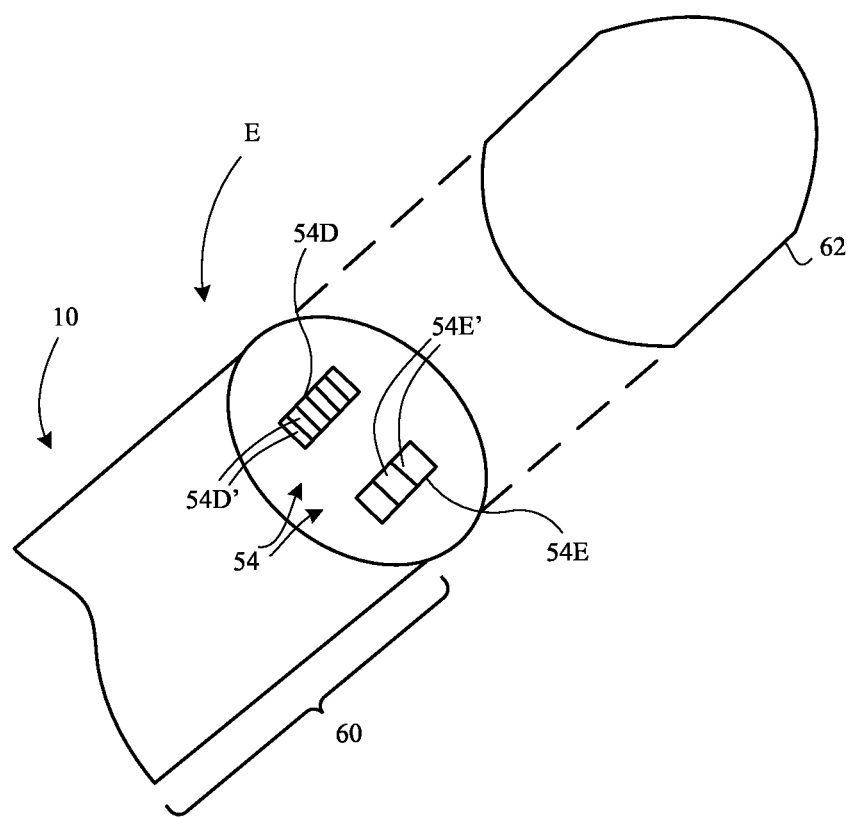
FIG. 3 is an exploded perspective view of an illustrative electronic device with a removable cap in accordance with an embodiment.

FIG. 3 is a perspective view of end E of electronic device 10 in an illustrative arrangement in which device 10 has a removable cap. As shown in FIG. 3, sensor 54 may, if desired, be mounted at end E. Sensor 54 includes a light detector such as light detector 54D for measuring the color of objects. If desired, sensor 54 may also include a light emitter such as light emitter 54E. Light emitter 54E can emit light to illuminate objects while light detector 54D is gathering corresponding color measurements.

Light detector 54D may be formed from an integrated circuit (e.g., a silicon integrated circuit) and/or discrete light detecting components. To discriminate between different colors, light detector 54D may have multiple photodetectors 54D' each of which gathers and measures light in a different band of wavelengths. These bands of wavelengths, which may sometimes be referred to as channels or color channels, may overlap slightly with each other and may, if desired, provide continuous coverage of the visible light spectrum (and, if desired, portions of the infrared light spectrum and/or ultraviolet light spectrum). Each photodetector may be overlapped by a corresponding thin-film interference filter with a desired light transmission spectrum and/or may be overlapped by a color filter formed from a layer of dye or pigment with a desired light transmission spectrum. The light transmission spectrum of each color filter may correspond to a band of wavelengths at a different location of the visible light spectrum or other desired portion of the light spectrum. For example, a red channel photodetector may have a color filter that passes red light wavelengths while blocking all other wavelengths. If desired, ultraviolet light sensitivity and/or infrared light sensitivity can be provided by incorporating ultraviolet and/or infrared channels into light detector 54D. Arrangements in which light detector 54D is used to make visible light measurements are sometimes described herein as an example.

In configurations in which light detector 54D is formed from an integrated circuit, photodetectors for different color channels can be distributed throughout the integrated circuit and, if desired, redundant photodetectors (e.g., photodetectors measuring the same color of light) may be included in light detector 54D. As an example, photodetectors 54D' may include photodetectors for 3-10 different color channels and each color channel may have 1-5 different individual photodetectors 54D' for gathering a light measurement for that color channel. Supporting circuitry (e.g., switching circuitry, amplifier circuitry, analog-to-digital conversion circuitry, communications circuitry for supporting communications with control circuitry elsewhere in device 10, etc.) may be incorporated into an integrated circuit that contains photodetectors 54D' or, if desired, some or all of this supporting circuitry for photodetectors 54D' may be formed in one or more integrated circuits that are separate from photodetectors 54D'.

Light emitter 54E may contain one or more light-emitting devices 54E' such as lasers (e.g., laser diodes such as vertical cavity surface emitting diodes or other laser diodes), light-emitting diodes (e.g., organic light-emitting diodes, light-emitting diodes formed from crystalline semiconductor dies, etc.), or other light-emitting components. Light emitter 54E may, as an example, include a single white light-emitting diode. As another example, light emitter 54E may contain multiple light-emitting devices 54E' such as light-emitting devices associated with different colors. There may be, for example, a first light-emitting device 54E' such as a red light-emitting device that is configured to emit red light (light in a band of wavelengths around a desired red wavelength), a second light-emitting device 54E' that is configured to emit blue light, and a third light-emitting device 54E' that is configured to emit green light. Optional additional light-emitting devices (e.g., an ultraviolet light-emitting device that emits ultraviolet light, infrared light-emitting devices, etc.) may also be included. Light emitter 54E may be configured to emit light in any suitable pattern. As an example, light emitter 54E (including optional lenses, mirrors, and/or other optical components that adjust light emission for emitter 54E) may be configured to emit light in a light field having a shape of a disk, a ring (e.g., a circular light field pattern with a central area of decreased brightness), a non-circular spot, or other suitable shape.

There may, in general, be any suitable number of photodetectors 54D' in light detector 54D and any suitable number of light-emitting devices 54E' in light emitter 54E. The number of photodetectors 54D' of different colors in detector 54D may, for example, be at least five, at least six, at least 10, at least 15, at least 20, at least 30, fewer than 50, fewer than 40, fewer than 35, fewer than 25, fewer than 15, or other suitable number. The number of light-emitting devices 54E' of different colors in light emitter 54E may be, for example, at least two, at least three, at least four, 2-10, less than 10, less than 5, less than the number of photodetectors 54D' in light detector 54D, or other suitable number.

Emitter 54E may use a white light light-emitting diode or other white light source to emit white light and/or multiple light-emitting devices 54E' in emitter 54E may be used simultaneously (e.g., to illuminate a surface of an external object such as object 50 with a combination of red, green, and blue illumination or). Light-emitting devices 54E' of different colors can also be used separately. Devices 54E' may, as an example, be used to emit red light (without emitting blue and green light) while light detector 54D makes a first set of color measurements using photodetectors 54D', and may then separately emit blue light and green light to make corresponding second and third sets of color measurements using photodetectors 54D'. The use of multiple different colors of illumination in sensor 54 allows sensor 54 to gather more spectral data than possible with a single white light source (e.g., by gathering three different sets of measurements when there are three different illumination colors to use), which can enhance color measurement accuracy.

Color data gathered by sensor 54 can be represented in any suitable format. For example, a color measurement may be represented using color coordinates, a color temperature, a correlated color temperature, spectral information (e.g., a visible light spectrum for the light from object 50 and/or infrared and/or ultraviolet spectral information). More accurate color measurements can be made (e.g., to produce an accurate color spectrum) by including more colors of light-emitting devices 54E' and/or by providing more detector channels (e.g., more photodetectors 54D' of different colors).

Sensor 54 may, if desired, be covered with a transparent cover (e.g., a cover formed from transparent polymer or other transparent material). In some arrangements, a diffuser may be formed (e.g., by using a polymer or glass cover with a sufficiently large haze value). Transparent cover structures for sensor 54 may be permanent and/or may include removable structures. For example, sensor 54 or part of sensor 54 may be covered with a portion of a housing structure such as a portion of housing 60 of FIG. 3. Cover structures may have tubes and other protrusions, bevels, lenses, and/or other optical structures to help emit and gather light during color measurements. Housing 60 may have a cylindrical shape or other elongated shape (e.g., a shape that forms a computer stylus shaft for device 10). Color sensors such as sensor 54 may be mounted at end E of the shaft, at opposing tip T of the shaft, and/or at an intermediate location along the length of the shaft.

If desired, a removable structure such as cap 62 may be used to cover sensor 54. An opaque cap may be removed to make color measurements of object 50. A transparent cap may be left in place during color measurements. If desired, different types of caps may be used by a user, each having a potentially different set of optical properties (e.g., a desired light-transmission spectrum, opacity, haze, physical and optical geometry, etc.). In some arrangements, system 8 may include a calibration cap formed from white polymer or other material. The reflection spectrum of the calibration cap material may be known to device 10. For example, a white polymer calibration cap may have a flat reflection spectrum across the visible light spectrum and may reflect 85% of incident visible light (as an example). Using the known optical properties of the calibration cap, device 10 can direct light emitter 54E to emit one or more different colors of light while gathering light measurements with light detector 54D. The results of these calibration measurements may be stored in device 10 and used to calibrate sensor 54. Capless arrangements and arrangements in which removable cap 62 is used for dust protection or other functions without serving as a calibration cap may also be used.

Figure 4:
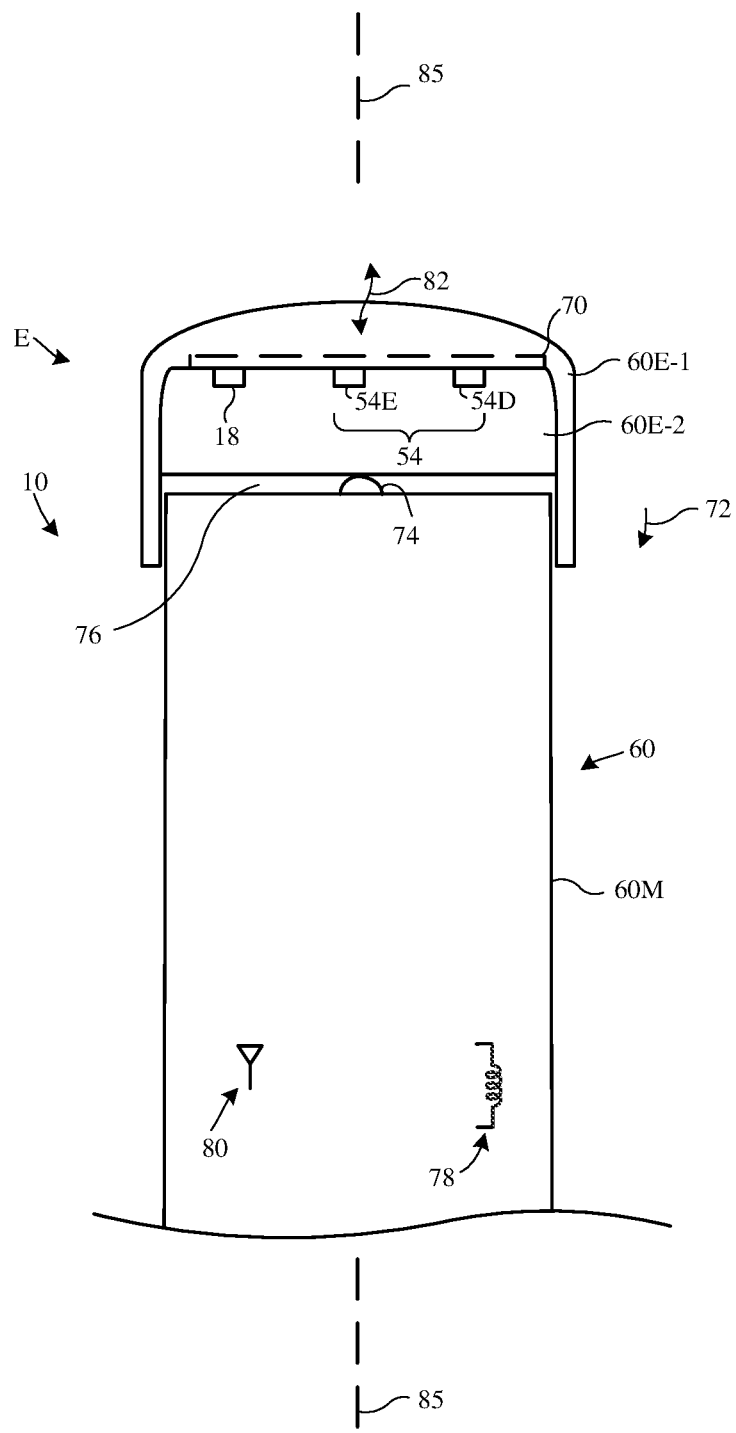
FIG. 4 is a cross-sectional side view of an end of an illustrative electronic device having a color sensor that may gather color measurements in response to activation of a switch and/or other input such as sensor input from proximity and/or orientation sensors in accordance with an embodiment.

FIG. 4 is a cross-sectional side view of device 10 in an illustrative arrangement in which sensor 54 is mounted at end E. As shown in FIG. 4, device 10 may include wireless power circuitry such as inductive power coil 78 for receiving and/or transmitting wireless power. Coil 78 may be mounted within the shaft of device 10.

During wireless power operations in system 8, coil 78 may, if desired, be used to transmit and/or receive in-band data. Device 10 may have one or more antennas such as antenna 80 (e.g., to handle Bluetooth® communications). Device 10 may have a housing such as housing 60 with a main portion such as portion 60M that forms an elongated shaft for device 10 (e.g., a shaft that is elongated along longitudinal axis 85. Housing 60 may have housing portions such as housing portions 60E-1 and 60E-2 that are coupled to portion 60M. In the example of FIG. 4, portion 60E-1 forms an outer surface for device 10 at end E. Portion 60E-1 may have transparent portions that allow light 82 associated with color sensor 54 to be emitted by light emitter 54E through portion 60E-1and to be received by light detector 54D through portion 60E-1 (after reflecting from an illuminated external surface). Optical sensors in sensors 18 may also operate through transparent portions of portion 60E-1, if desired. Optional diffuser 70 (e.g., a hazy portion of portion 60E-1) may be used to help homogenize emitted and received light. If desired, light collimation components (e.g., lenses, etc.) may be incorporated into portion 60E-1.

Portion 60E-2 of housing 60 may be coupled to housing portion 60E-1 and may be used to support sensor 54. Portion 60E-2 may be separated from main portion 60M of housing 60 by air gap 76. Portions 60E-1 and 60E-2 may be configured to move together relative to portion 60M when force is applied to portion 60E-1.

When it is desired to gather a color measurement with sensor 54, a user may press portion 60E-1 against external object 50. This forces portion 60E-2 in direction 72 and activates an input device such as switch 74. For example, movement of portion 60E-2 in direction 72 may compress switch 74, thereby activating switch 74. Control circuitry 12 detects the activation of switch 74, and, in response, gathers a color measurement using sensor 54. Switch 74 may include a spring or other mechanism that helps separate portions 60E-2 and 60M after the color measurement has been made.

Use of a switch-based trigger mechanism for device 10 is illustrative. If desired, one or more other color measurement trigger mechanisms based on one or more other input devices may be used, either alone or in combination with a switched-based trigger mechanism. As an example, device 10 may include one or more sensors 18 for use in triggering a color measurement. Sensors 18 may include, for example, an optical proximity sensor that uses an infrared light source to emit infrared light and that uses an infrared light detector to measure the amount of the emitted infrared light that is reflected from object 50 back to device 10. Visual light may also be used, if desired. The optical proximity sensor may detect when end E (and sensor 54) are adjacent to an object of interest for color measurement (e.g., the optical proximity sensor can trigger the color measurement by sensor 54). As another example, sensor 18 may include a capacitive proximity sensor, a mechanical switch, a force sensor, an ultrasonic proximity sensor, and/or other sensor for detecting the presence of external object 50 in the vicinity of end E. Sensor 18 may also include a sensor such as an inertial measurement unit (e.g., a sensor that measures position, orientation, and/or movement of device 10). In response to detecting that device 10 is in an upright position (e.g., when end E is above tip T), control circuitry 12 may inhibit color sensor measurements. In response to detecting that device 10 is in an upside down position (e.g., in response to detecting that tip T is above end E), control circuitry 12 may use sensor 54 in making a color measurement.

Control circuitry 12 may, if desired, implement a sensor fusion arrangement in which input from multiple input devices such as sensors 18 is processed to determine when to gather a color measurement with sensor 54. For example, control circuitry 12 may gather a color sensor measurement in response to detecting both (1) that an optical proximity sensor in end E has detected that end E is adjacent to object 50 and (2) an orientation sensor such as an inertial measurement unit in device 10 has detected that housing 60 and device 10 are upside down so that end E is lower than tip T. As another example, control circuitry 12 may direct color sensor 54 to gather a color sensor measurement in response to output from an input device such as an optical proximity sensor, an input device such as switch 74, and an input device such as an inertial measurement unit or may make a decision to gather a color sensor measurement using information from a mechanical switch and an optical proximity sensor or based on information from other sets of two or more sensors. In some embodiments, an input-device such as a button based on a touch sensor or mechanical switch that is mounted on the side of portion 60M of housing 60 may be used in triggering color measurements. Output from a force sensor, optical proximity sensor, and/or other sensor 18 located at tip T or gathering and/or emitting light at tip T through a light guide may also be used by control circuitry 12 in determining whether to make a color sensor measurement. Objects on which color measurements are made (see, e.g., object 50 of FIG. 1) may include real-world objects (furniture, household items, etc.), displays such as display 34, printed paper (e.g., artwork on a printed page), paint on a house or other surface, a portion of a human body (skin, hair, etc.), and/or may other physical items in the environment surrounding device 10 from which a user desires to gather color information.

Figure 5:
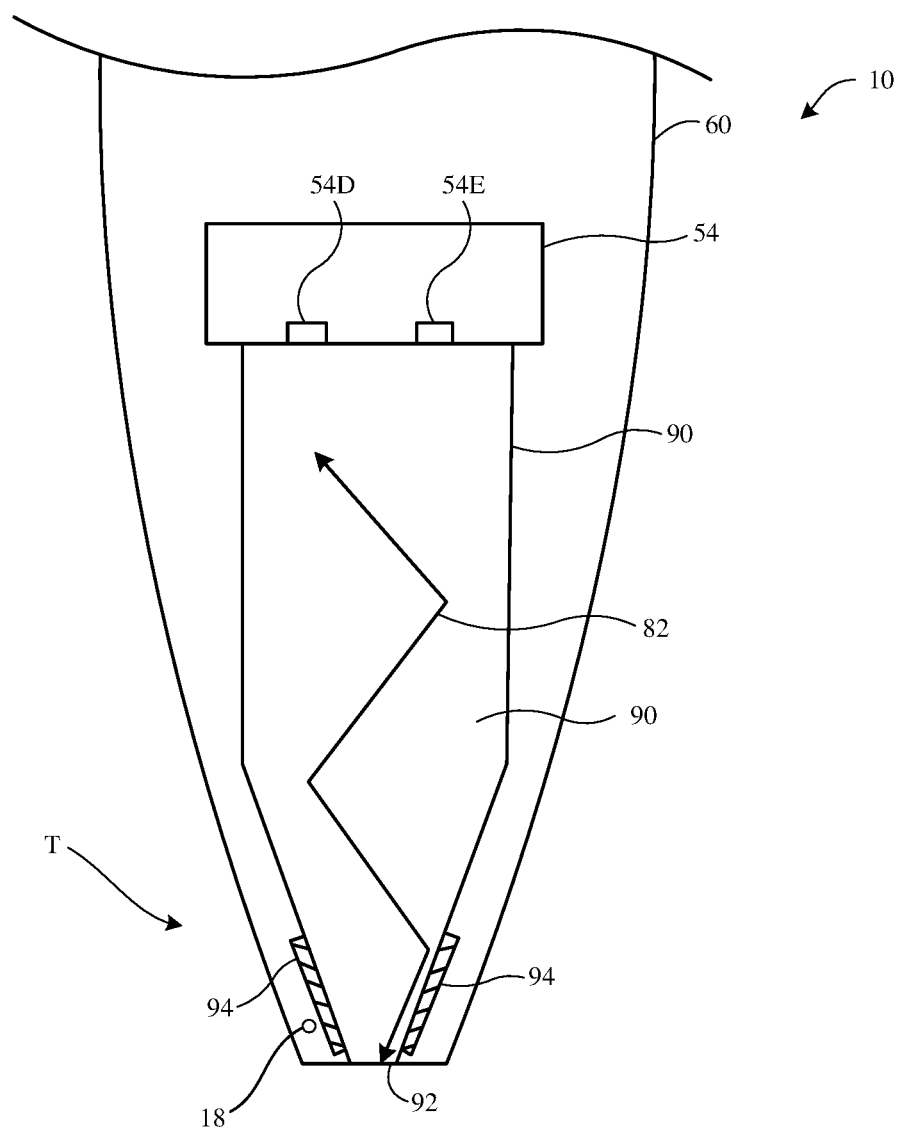
FIG. 5 is a cross-sectional side view of an illustrative electronic device having a light guide for guiding light between a tip of the electronic device and a color sensor mounted in an interior portion of the electronic device in accordance with an embodiment.

If desired, sensor 54 may be used to make color measurements at tip T of device 10. As shown in FIG. 5, transparent structures 90 (sometimes referred to as light guide structures, a light guide, or optical fiber structures) may be included in housing 60 of device 10. Structures 90 may be used to guide light between exposed surface 92 of structures 90 at tip T and sensor 54, which is located farther up the length of the shaft of device 10, where more space is available for mounting light emitter 54E and light detector 54D. Structures 90 may include, for example, a clear polymer or glass member that forms a light guide while also forming a support structure for electrodes 94. When a user is using device 10 to draw on a touch sensitive display such as display 34 of device 24 of FIG. 1, electrodes 94 may be driven with alternating current signals that create electromagnetic signals that are detected by an array of capacitive sensor electrodes in a two-dimensional touch sensor overlapping display 34. In some configurations, sensor(s) 18 may be located within housing 60 at tip T of device 10 to detect when suitable color measurement triggering criteria have been satisfied. Sensors 18 may include, for example, a force sensor, an optical proximity sensor, a capacitive proximity sensor, an ultrasonic proximity sensor, a mechanical switch, and/or other sensor or sensors for detecting when tip T is being pressed against object 50 or is otherwise adjacent to an object of interest for a color measurement. In response to detecting output from one or more color measurement triggering sensors, control circuitry 12 can direct color sensor 54 to make a color measurement. During the color measurement, light emitter 54E may emit light that is guided along structure 90 and out of tip surface 92 to external object 50. This illuminates object 50 with the emitted light. Some of the emitted light is reflected (e.g., backscattered and/or specularly reflected) back to surface 92 and is conveyed by structure 90 to light detector 54D for measurement. In some configurations, color measurements may also be made at tip T, end E, and/or elsewhere in housing 60 without emitting light from emitter 54E (e.g., using ambient light illumination).

Figure 6:
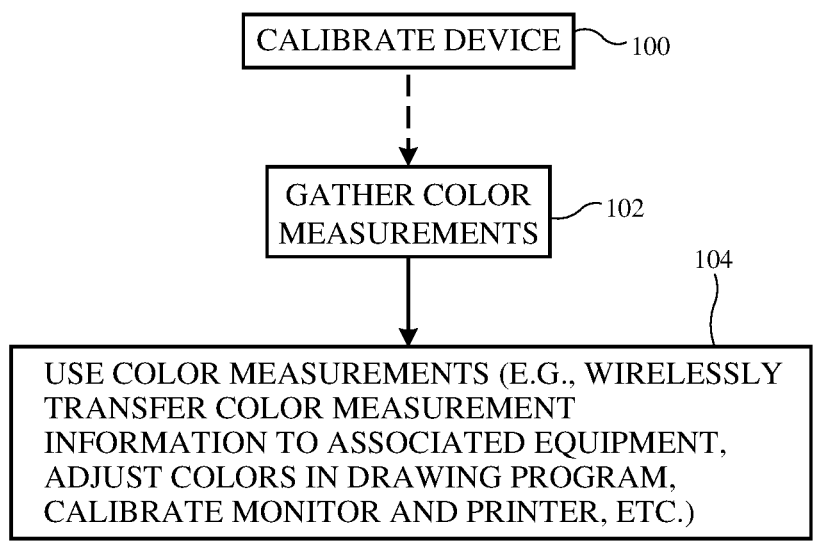
FIG. 6 is a flow chart of illustrative operations associated with using a system in accordance with an embodiment.

Illustrative operations associated with using system 8 are shown in FIG. 6.

Initially, during the operations of block 100, the sensor system in device 10 can be calibrated. With an illustrative arrangement, sensor 54 can gather sensor measurements from a color calibration chart. The color calibration chart may have an array of color patches of known colors (sometimes referred to as color references, reference colors, reference color patches, etc.). The color patches may include a variety of different colors (e.g., neutral, gray-scale colors and non-neutral colors such as primary colors and other non-neutral colors). There may be any suitable number of color patches in the color calibration chart (e.g., at least 5, at least 10, at least 20, at least 30, fewer than 50, fewer than 30, fewer than 20, etc.). As an example, the color calibration chart may have 24 color patches.

During calibration operations, color sensor 54 may gather a color measurement from each of the color patches. There may be N channels (e.g., N photodetectors 54D' of different colors) in sensor 54 and there may be M color patches of different colors in the color calibration chart. The color chart calibration measurements made with sensor 54 will therefore produce an M×N color chart measurement matrix $DC_{MN}$. If, for example, there are 15 different color channels in sensor 54 (e.g., if N is 15) and if there are 24 different color patches in the color calibration chart (e.g., if M is 24), matrix $DC_{MN}$ will be a 24×15 matrix. Each of the rows of matrix DC (e.g., each of the 24 rows in this example) will contain 15 column entries corresponding to the 15 different channel measurements (intensity measurements) from the 15 respective differently colored photodetectors 54D' in sensor 54.

Equation 1 shows the relationship between matrix DC, transfer matrix T, and color value matrix XYZ.

$$DC_{MN} * T_{N3} = XYZ_{M3} \quad (1)$$

Color value matrix XYZ has M rows. There are 3 columns in matrix XYZ, each column corresponding to a respective X, Y, or Z color value in XYZ color space. Transfer matrix T is an N×3 matrix that maps the M color measurements made with sensor 54 from matrix DC to the M color value rows in color value matrix XYZ. During training operations, sensor 54 captures M measurements (e.g., M rows in DC, each containing N color channels of data). The corresponding M color value rows of matrix XYZ are known, because the color values of the color patches in the color calibration chart are known reference colors. Using the pseudoinverse method, transfer matrix T can be obtained from equation 1. During a subsequent color measurement operation (e.g., when device 10 is being used by a user), equation 2 can be used to determine the color value of a sensor measurement.

$$xyz_{13} = SR_{1N} * T_{N3} \quad (2)$$

In equation 2, $T_{N3}$ is the transfer matrix that was obtained during the calibration operations of block 100. $SR_{1N}$ is a 1×N sensor reading matrix (e.g., a matrix where each entry corresponds to a photodetector reading from a different corresponding one of the N color channels in sensor 54). Matrix (vector) $xyz_{13}$ corresponds to the color value of the measurement being made. Color value xyz may be a 1×3 matrix in XYZ color space. If desired, a color measurement may be represented using another color space, may be represented as a complete visual light spectrum (e.g., a spectrum extending from 380 nm to 700 nm or covering another suitable range of wavelengths), may be represented using a color temperature, may be represented using a correlated color temperature, may be represented using other color measurement formats, and/or may be represented using a combination of these approaches. The gathering of color measurements in XYZ color space is illustrative.

In the foregoing example, light detector 54D has a plurality of different photodetectors each sensitive to light in a different band of wavelengths and light emitter 54E is a white light emitter. If desired, light emitter 54E may have multiple light-emitting devices 54E' of different colors. In arrangements in which there are multiple light-emitting devices 54E' in sensor 54 that emit light of multiple different respective colors, calibration measurements can be made during illumination of the color calibration chart under each different respective color of light. During operation, sensor 54 can then produce illumination of each of these different respective colors while using the photodetectors of the light detector in sensor 54 to make light readings. Arrangements in which light emitter 54E is a single white light source such as a single white light-emitting diode are illustrative.

The calibration operations of block 100 may be performed on a per-device basis or may be performed on sample devices (e.g., as part of a batch process). Calibration may be performed during manufacturing and/or may be performed during use of device 10 by an end user. Calibration information (e.g., matrix T) may be stored in storage in device 10 and/or may be stored in device 24 or elsewhere in system 8 for use during subsequent sensor measurements.

During the operations of block 102, device 10 and, if desired, additional equipment such as device 24 of FIG. 1, may be used in system 8 by an end user. Device 10 may, for example, be placed in a position of the type shown by device 10' in FIG. 1 in which sensor 54 is adjacent to the surface of an item of interest (e.g., object 50). In this position, sensor 54 may be used to measure the color of object 50. Color measurements may also be made through tip T, if desired.

Device 10 may initiate the gathering of a color measurement in response to detection of any suitable color measurement trigger criteria (color measurement gathering criteria). As an example, device 10 may use sensor 54 to gather a color measurement in response to detecting button activation indicating that a button has been pushed, in response to detecting that sensor 54 is adjacent to an item for which a color measurement is desired (e.g., as determined based on output from an optical proximity sensor, a capacitive proximity sensor, an acoustic proximity sensor, a force sensor, a switch-based input device, or output from other proximity detection circuitry), output from a sensor that measures the position, orientation, and/or movement of device 10 such as an internal measurement unit (e.g., an accelerometer, compass, and/or gyroscope), output from other sensors 18, and/or output from two or more, three or more, or four or more of these input devices in a sensor fusion arrangement.

Color measurements may be gathered using multiple color channels in light detector 54D. Light emitter 54E may use one or more light-emitting devices 54E' to emit while light and/or light of other colors (e.g., red light, blue light, green light, etc.) while light detector 54D is gathering data. Color measurements may be made using a color sensor in tip T, a color sensor in or near end E, a color sensor that emits and receives light through a light guide (e.g., a light guide at tip T or other portion of housing 60), and/or color sensor circuitry in other portions of device 10. To help reduce the impact of background noise (e.g., stray ambient light noise), the illumination that is produced by light emitter 54E may be modulated in accordance with a predetermined pattern. For example, light from light emitter 54E may be modulated in accordance with an alternating-current modulation scheme (e.g., at a given frequency or at multiple frequencies), may be modulated in accordance with a predetermined pattern of on and off periods specified by a digital bit sequence, etc. Control circuitry in device 10 may, as an example, direct light emitter 54E to emit light at an intensity that is modulated at frequency f and may remove corresponding signals from detector 54D that are not associated with frequency f Using this type of arrangement, the control circuitry can determine which portion of detected light is associated with reflections of the emitted light from the object being measured and which portion of detected light is associated with other illumination such as ambient light illumination of the object being measured. Color measurements can be affected by colored ambient light, so separating the portion of the measured signal associated with emitted light illumination and the portion of the measured signal associated with ambient light illumination can help enhance color measurement accuracy.

Control circuitry in device 10 can also distinguish between objects that emit light (e.g., displays) and objects that reflect light (e.g., a non-electronic object such as a piece of furniture). With one illustrative arrangement, control circuitry in device 10 may modulate light emitter 54E by turning light emitter 54E on and off in alternation so that the emitted light blinks. While emitter 54E is emitting blinking light, light detector 54D may be used to synchronously make color measurements. The measurements that are being made may be made both when light emitter 54E is on (and is emitting light) and when light emitter 54E is off (and is not emitting light). When a signal is measured while light emitter 54E is off that is higher than a predetermined threshold level, the control circuitry of device 10 can conclude that the external object being measured is a display or other self-emitting device that is emitting light. The data captured during the period of time when light emitter 54E is off can then be used as a measurement of the external object's color (e.g., the signals from detector 54D that are obtained when light emitter 54E are off can be used to determine the color of the object being measured). In response to determining that the measured signal of the object when light emitter 54E is off is lower than a predetermined threshold, the control circuitry of device 10 can conclude that the external object being measured is a reflective object. In this case, the control circuitry can use the data gathered while light emitter 54E is on to make color measurements. The blinking frequency may be 1 Hz to 10 Hz or other suitable frequency. Multiple data measurements that are made during the periods when light emitter 54E is on or off can be accumulated and/or averaged to increase the signal-to-noise ratio of the color measurements.

The color measurement may correspond to an inanimate object such as a printed item, a colored real-world object such as a piece of furniture, a portion of a user's home, toys, decorative objects, household objects, plants, other outdoor items, and/or other objects in the user's environment. The color measurement may also, if desired, correspond to human skin, the color of other human body parts, or other living items or biological samples (e.g., to capture health information). If desired, color measurements may be made on pH test cards or other color sensitive test cards that have been exposed to bodily fluids (e.g., for testing of glucose, protein, ketones, pH, etc.). Color measurements may be made on food, cosmetics, art supplies, and/or any other objects. In some arrangements, system 8 may include a display such as display 34 of FIG. 1. System 8 may include electronic devices that produce hard-copy output such as printed paper output from a color printer. If desired, sensor 54 may be used to gather color measurements of test patches illuminated on display 34 and/or test patches printed by a printer onto a test page.

During the operations of block 104, system 8 may use the color measurement(s) made during the operations of block 102. For example, device 10 may transfer color measurement information (e.g., the measured color of object 50) to a drawing program or other software in device 10. As the tip of device 10 is moved across display 34, the drawing program may draw objects such as line 52 of FIG. 1 that have a color that is based on the measured color. For example, line 52 may have the same color as the measured color of object 50. Measured colors may be placed in a list of colors (e.g., a measured color may be added to a color palette of available colors in a drawing program), measured colors may be used to produce related colored content in a program (e.g., complementary colors), and/or may otherwise be used by the software of device 24 in performing an action for the user. Examples of actions that may be performed using the color measurement include home improvement tasks (e.g., using a program to recommend decorative objects, paint, rugs, etc. based on sampled colors), health tasks (e.g., issuing alerts or preparing reports for a user based on measured skin attributes, measured colors associated with test cards exposed to bodily fluids, measured body part color, etc.), food-related tasks (e.g., determining whether food has been exposed to oxygen, evaluating potential indicators of nutritional value in foods, etc.), and tasks associated with selecting cosmetics, clothing, or other personal items. If desired, color measurements may be used in performing tasks associated with display calibration and printer calibration. For example, system 8 may use color measurements to calibrate color output from display 34 and/or to calibrate color associated with printed output from a printer in system 8 (e.g., in an arrangement in which one of devices 24 is a printer). In this way, system 8 may help ensure that display output colors and colors on printed output from a printer are accurate and may help ensure that displayed colors match printed colors. In general, color measurement information gathered by sensor 54 in device 10 may be used to take action in device 10 and/or in other devices in system 8 such as device 24. If desired, color measurements may be uploaded to an online database (e.g., for sharing with remote devices and/or remote servers).

System 8 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

| Table of Reference Numerals | | | |
|---|---|---|---|
| 8 | System | 10 | Electronic Device |
| 12 | Control Circuitry | 14 | Communications Circuitry |
| 16 | Input-Output Devices | 18 | Sensors |
| 22 | Other Devices | 24 | Electronic Device |
| 26 | Control Circuitry | 28 | Communications Circuitry |
| 30 | Input-Output Devices | 32 | Sensors |
| 34 | Display | 36 | Other Devices |
| 38 | Wireless Link | 50 | Object |
| 52 | Line | 54 | Color Sensor |
| 60 | Housing | 62 | Cap |
| 70 | Optional Diffuser | 72 | Direction |
| 74 | Switch | 76 | Air Gap |
| 78 | Coil | 80 | Antenna |
| 82 | Light | 90 | Structures |
| 92 | Surface | 94 | Electrodes |
| T | Tip | E | End |

The foregoing is merely illustrative and various modifications can be made to the described embodiments. The foregoing embodiments may be implemented individually or in any combination.

What is claimed is:

1. A stylus configured to measure an external object, comprising:
   an elongated housing with a tip and an opposing end;
   a color sensor in the elongated housing, wherein the color sensor comprises a light-emitting device;
   a light guide structure coupled between the color sensor and the tip; and
   control circuitry configured to gather color measurements of the external object using the color sensor, wherein the color sensor is configured to measure light that is emitted by the external object, and wherein at least some of the color measurements are gathered while the light-emitting device is turned off.

2. The stylus defined in claim 1 wherein the color sensor comprises a photodetector, the light-emitting device is configured to emit light at the external object, and the photodetector is configured to measure the light after it has reflected from the external object.

3. The stylus defined in claim 2 wherein the light guide is configured to guide the light from the light-emitting device to the tip.

4. The stylus defined in claim 3 wherein the light guide is configured to guide the reflected light from the tip to the photodetector.

5. The stylus defined in claim 2 wherein the light-emitting device is one of a plurality of light-emitting devices that are configured to emit respective different colors of light.

6. The stylus defined in claim 2 wherein the light-emitting device emits white light.

7. The stylus defined in claim 1 further comprising an electrode at the tip that is configured to supply electromagnetic signals to an external touch sensor.

8. The stylus defined in claim 7 further comprising an orientation sensor.

9. The stylus defined in claim 8 wherein the control circuitry is configured to use the color sensor to gather the color measurements in response to information from the orientation sensor.

10. The stylus defined in claim 8 further comprising:
    a coil configured to receive wireless power.

11. The stylus defined in claim 1 wherein the color sensor comprises a light detector, wherein the control circuitry is configured to blink the light-emitting device on and off while gathering synchronized data from the light detector, and wherein the control circuitry is configured to use signals obtained from the light detector when the light-emitting device is off to gather the color measurement of the external object.

12. A stylus configured to sense an external object, comprising:
    an elongated housing with a tip and an opposing end;
    a color sensor in the elongated housing that is configured to receive light through the tip, wherein the color sensor comprises a light-emitting device;
    control circuitry configured to use the color sensor to gather color measurements of the external object, wherein at least some of the color measurements are gathered while the light-emitting device is turned off; and
    an electrode at the tip that is configured to supply electromagnetic signals to an external touch sensor.

13. The stylus defined in claim 12 further comprising:
    an orientation sensor that is configured to determine an orientation of the elongated housing.

14. The stylus defined in claim 13 further comprising a coil configured to receive wireless power.

15. The stylus defined in claim 12 wherein the light-emitting device is one of a plurality of light-emitting devices and wherein the color sensor comprises at least one photodetector.

16. The stylus defined in claim 15 wherein the plurality of light-emitting devices is configured to output emitted light to illuminate the external object while the at least one photodetector detects reflected light from the external object.

17. The stylus defined in claim 16 further comprising:
    light guide structures that guide the emitted light from the plurality of light-emitting devices to the tip and that guide the reflected light from the tip to the photodetector.

18. The stylus defined in claim 17 wherein each of the light-emitting devices in the plurality of light-emitting devices is configured to emit light in a different band of wavelengths.

19. A stylus configured to measure an external object, comprising:
    an elongated housing with a tip and an opposing end;
    a color sensor in the elongated housing, wherein the color sensor comprises a light-emitting component and a light-detecting component;
    light guide structures that guide light emitted by the light-emitting component to the tip and that guide light from the tip to the light-detecting component; and
    control circuitry configured to gather color measurements of the external object using the color sensor, wherein at least some of the color measurements are gathered while the light-emitting component is turned off.

20. The stylus defined in claim 19 wherein the light-emitting component is one of a plurality of light-emitting components that are configured to emit respective different colors of light.

* * * * *